C. H. HASSELBLAD.
ARTIFICIAL SAUSAGE SKIN AND METHOD OF PRODUCING IT.
APPLICATION FILED JULY 11, 1910.
1,036,839.  Patented Aug. 27, 1912.
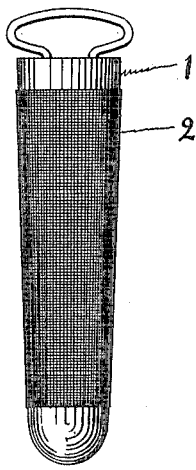
WITNESSES
INVENTOR
Carl Hugo Hasselblad
BY
Wallace White
ATTY.

UNITED STATES PATENT OFFICE.

CARL HUGO HASSELBLAD, OF STOCKHOLM, SWEDEN.

ARTIFICIAL SAUSAGE-SKIN AND METHOD OF PRODUCING IT.

1,036,839.  Specification of Letters Patent.  Patented Aug. 27, 1912.

Application filed July 11, 1910. Serial No. 571,376.

*To all whom it may concern:*

Be it known that I, CARL HUGO HASSELBLAD, manufacturer, subject of the King of Sweden, residing at Hornsgatan 64, Stockholm, in the Kingdom of Sweden, have invented certain new and useful Improvements in Artificial Sausage-Skin and Method of Producing It, of which the following is a specification.

The present invention has for its object artificial sausage-skin, intended to be used as a substitute for the natural sausage-skins, otherwise used in producing sausages and the like eatables, and method for manufacturing such artificial sausage-skins.

The present artificial sausage-skin consists of a sleeve of fabric, for instance so called gauze-linen or the like, serving as a structure for the artificial skin, impregnated with a gluey or pastelike mass as for instance decoction of rind of bacon, or gelatin, to which latter some lard or lardy substance suitably may be mixed in.

As an example for the manufacturing of the artificial sausage-skin in question the following is stated. A sleeve or casing of a fabric suitable for the purpose, for instance so called gauze linen, of a size and form corresponding to the size and form of the sausage for the manufacture of which the artificial skin is intended to be used, is impregnated, *e. g.* through coating it, or pouring over it with the above mentioned gluey or pastelike mass or by immersing the sleeve into the same. The impregnated sleeve is suitably further exposed to a treatment in order that the material by which it has been impregnated, might stiffen, respectively be made resistant against boiling water. This treatment is of course in each special case adapted with regard to the properties of the gluey material, used for the impregnation. One can for instance for that purpose treat the sleeve after the impregnation with such gases or fluids which have such an influence on the material, used for the impregnation, that the before mentioned effects are attained. As an example on this treatment the procedure might be mentioned, that the sleeve, impregnated with gluey material, are immersed in, or in other way exposed to the influence of a solution of a salt of aluminium, *e. g.* acetate of aluminium, or any other such inorganic or organic substances, in solution or in gaseous state, which makes the limy material insoluble or difficult to dissolve in water, after which the excess of the reagent used is removed through washing with water.

In order to facilitate the carrying out of the several processes the sleeve may before or after the impregnation be threaded upon a model or body of suitable form, and threaded upon this model, be exposed to the several treatments above mentioned, whereafter it is removed from the same. For the purpose of facilitating the threading on, the sleeve upon said body respectively removing it from the same, the said body, as well as the sleeve may suitably be of a somewhat conical shape as shown on the accompanying drawing, where 1 represents the said body, suitably formed of sheet metal and 2 represents the sleeve threaded upon the same.

Throughout the specification and claims the word "gluey" is meant to include the substance gelatin.

Having thus described my invention, I declare, that what I claim is:—

1. An artificial sausage-skin consisting of a sleeve of fabric impregnated with a gluey substance.

2. An artificial sausage-skin consisting of a sleeve of fabric impregnated with a decoction of bacon rind.

3. An artificial sausage-skin comprising a sleeve of fabric impregnated with a gluey substance mixed with a lardy substance.

4. The herein described process of manufacturing artificial sausage-skin, which consists in impregnating a sleeve of fabric with a decoction of bacon rind and treating the impregnated sleeve with a substance adapted to stiffen the impregnating substance.

5. The herein-described process of manufacturing artificial sausage-skins, which consists in impregnating a sleeve of fabric with decoction of bacon rind and subjecting the impregnated fabric to the action of a salt of aluminium of such a character as will stiffen said decoction.

In witness whereof I have hereunto set my hand in presence of two witnesses.

CARL HUGO HASSELBLAD.

Witnesses:
FORSTER MELINDER,
HEDING MELINDER.